United States Patent
Hötzel et al.

(10) Patent No.: US 11,214,126 B2
(45) Date of Patent: Jan. 4, 2022

(54) AIR CONDITIONING SYSTEM OF A MOTOR VEHICLE AND METHOD FOR OPERATING THE AIR CONDITIONING SYSTEM

(71) Applicant: Hanon Systems, Daejeon (KR)

(72) Inventors: Martin Hötzel, Ratingen (DE); Navid Durrani, Kerpen (DE); Christoph Bara, Cologne (DE)

(73) Assignee: Hanon Systems, Daejeon (KR)

( * ) Notice: Subject to any disclaimer, the term of this patent is extended or adjusted under 35 U.S.C. 154(b) by 584 days.

(21) Appl. No.: 15/951,748

(22) Filed: Apr. 12, 2018

(65) Prior Publication Data

US 2018/0319254 A1    Nov. 8, 2018

(30) Foreign Application Priority Data

May 2, 2017  (DE) .......................... 102017109309.5

(51) Int. Cl.
*B60H 1/32* (2006.01)
*B60H 1/00* (2006.01)

(52) U.S. Cl.
CPC ....... *B60H 1/3211* (2013.01); *B60H 1/00028* (2013.01); *B60H 1/00057* (2013.01);
(Continued)

(58) Field of Classification Search
CPC .. B60H 1/3211; B60H 1/00899; B60H 1/323; B60H 1/32281; B60H 1/00028;
(Continued)

(56) References Cited

U.S. PATENT DOCUMENTS 4,208,887 A * 6/1980 Morse ................ F25B 40/00
62/503
5,265,437 A * 11/1993 Saperstein ........... B60H 1/3229
62/243
(Continued)

FOREIGN PATENT DOCUMENTS

DE   102009008608 A1   10/2009
DE   102012100525 A1    1/2013
(Continued)

OTHER PUBLICATIONS

Gerhard Wenske Chemie Chemistry, ISBN 0-89573 527 X (Year: 1994).*
(Continued)

*Primary Examiner* — Eric S Ruppert
*Assistant Examiner* — Kirstin U Oswald
(74) *Attorney, Agent, or Firm* — Norton Rose Fulbright US LLP; James R. Crawford

(57) ABSTRACT

An air-conditioning system of a motor vehicle having refrigerant circulation and coolant circulation. Refrigerant circulation comprises a compressor, a refrigerant-coolant heat exchanger operable as condenser/gas cooler for heat transfer between the refrigerant and the coolant, a first expansion element and a first refrigerant-air heat exchanger for conditioning the inflowing air for the passenger compartment. Coolant circulation is developed with a conveying device, a first coolant-air heat exchanger for heating the inflowing air for the passenger compartment, a second coolant-air heat exchanger and the refrigerant-coolant heat exchanger. Refrigerant circulation also includes a second refrigerant-air heat exchanger, operable exclusively as evaporator. Upstream of the second refrigerant-air heat exchanger in the direction of flow of the refrigerant, a second expansion element is disposed. The second expansion element and the second refrigerant-air heat exchanger are disposed within a
(Continued)

Figure 2:
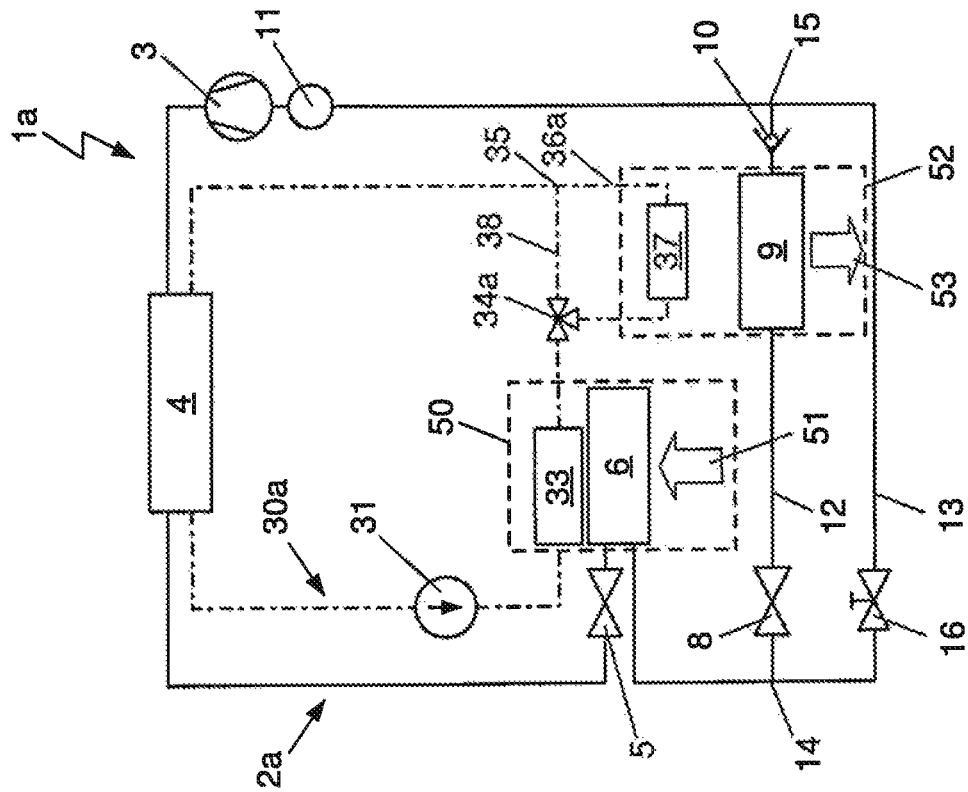

first flow path. A method for operating the air-conditioning system.

16 Claims, 4 Drawing Sheets

(52) U.S. Cl.
CPC ......... *B60H 1/00899* (2013.01); *B60H 1/321* (2013.01); *B60H 1/323* (2013.01); *B60H 1/32281* (2019.05); *B60H 2001/00085* (2013.01); *B60H 2001/00092* (2013.01); *B60H 2001/00178* (2013.01); *B60H 2001/00928* (2013.01)

(58) Field of Classification Search
CPC ................ B60H 1/00057; B60H 1/321; B60H 2001/00928; B60H 2001/00085; B60H 2001/00092; B60H 2001/00178; B60H 1/00335; B60H 1/3227; B60H 1/00271; B60H 1/3213; F25B 41/40; F25B 41/26; F25B 43/00
USPC .......................................................... 62/239
See application file for complete search history.

(56) References Cited

U.S. PATENT DOCUMENTS

| | | | | |
|---|---|---|---|---|
| 5,899,086 | A * | 5/1999 | Noda ................. | B60H 1/00914 62/244 |
| 6,681,597 | B1 * | 1/2004 | Yin ...................... | F25B 43/006 62/503 |
| 2001/0020529 | A1 * | 9/2001 | Karl ................... | B60H 1/00007 165/202 |
| 2004/0011070 | A1 * | 1/2004 | Satzger .................. | F25B 40/00 62/323.1 |
| 2004/0134217 | A1 * | 7/2004 | Itoh .................... | B60H 1/00392 62/324.1 |
| 2005/0103488 | A1 * | 5/2005 | Ichishi ................. | B60H 1/3428 165/202 |
| 2006/0137388 | A1 * | 6/2006 | Kakehashi ............. | B60H 1/323 62/513 |
| 2008/0202722 | A1 * | 8/2008 | Feuerecker ............. | F25B 13/00 165/41 |
| 2010/0012295 | A1 * | 1/2010 | Nemesh .............. | H01M 10/663 165/104.19 |
| 2010/0064700 | A1 * | 3/2010 | Ziehr ...................... | B60H 1/323 62/84 |
| 2011/0005255 | A1 * | 1/2011 | Tanihata ............ | B60H 1/00921 62/238.7 |
| 2011/0146266 | A1 * | 6/2011 | Weinbrenner ...... | F02B 29/0412 60/599 |
| 2012/0222441 | A1 * | 9/2012 | Sawada .............. | B60H 1/32284 62/238.1 |
| 2012/0304674 | A1 * | 12/2012 | Schwarzkopf ..... | B60H 1/32281 62/79 |
| 2014/0138049 | A1 * | 5/2014 | Schroeder .......... | B60H 1/00321 165/63 |
| 2014/0144160 | A1 * | 5/2014 | Jackson .............. | H01M 10/625 62/62 |
| 2016/0082805 | A1 * | 3/2016 | Graaf ................. | B60H 1/00328 165/202 |

FOREIGN PATENT DOCUMENTS

| | | |
|---|---|---|
| DE | 10 2012 111 672 A1 | 10/2013 |
| DE | 10 2012 108 891 A1 | 3/2014 |
| DE | 102013206630 A1 | 10/2014 |
| DE | 112014005360 T5 | 8/2016 |
| JP | S6046320 U | 4/1985 |
| JP | H0478007 U | 7/1992 |
| JP | H0655819 U | 8/1994 |
| JP | 10100663 A | 4/1998 |
| JP | 3781147 B2 | 5/2006 |
| JP | 2006182344 A | 7/2006 |
| JP | 2007191057 A | 8/2007 |
| JP | 2009030456 A | 2/2009 |
| JP | 2009-184493 A | 8/2009 |
| JP | 2010012820 A | 1/2010 |
| JP | 2010083177 A | 4/2010 |
| JP | 2011105150 A | 6/2011 |
| KR | 20160034155 A | 3/2016 |
| WO | 2011016264 A1 | 2/2011 |

OTHER PUBLICATIONS

Langenscheidt's Dictionary Technology & Applied Sciences, ISBN 3-86117-187-2 (Year: 2002).*

* cited by examiner

AIR CONDITIONING SYSTEM OF A MOTOR VEHICLE AND METHOD FOR OPERATING THE AIR CONDITIONING SYSTEM

CROSS REFERENCE TO RELATED APPLICATIONS

This application claims priority from German Patent Application No. 102017109309.5 filed May 2, 2017, which is hereby incorporated by reference in its entirety.

The invention relates to an air-conditioning system for conditioning the air of a passenger compartment of a motor vehicle, with a refrigerant circulation and a coolant circulation. The refrigerant circulation comprises a compressor, a refrigerant-coolant heat exchanger operable as condenser/gas cooler for the heat transfer between the refrigerant and the coolant of the coolant circulation, a first expansion element as well as a first refrigerant-air heat exchanger for conditioning the inflowing air for the passenger compartment. The coolant circulation is implemented with a conveying device for circulating the coolant, a first coolant-air heat exchanger for heating the inflowing air for the passenger compartment, a second coolant-air heat exchanger as well as the refrigerant-coolant heat exchanger.

The invention furthermore relates to a method for operating the air-conditioning system.

In motor vehicles known in prior art the waste heat of the engine is used for heating the air flowing into the passenger compartment. By means of the coolant circulated in the engine coolant circulation, the waste heat is transported to the air-conditioning system and here, across a thermal heat exchanger, transferred to the air flowing into the passenger compartment. At low ambient temperatures known installations with coolant-air heat exchangers, which draw the heating energy from the coolant circulation of an efficient combustion engine of the motor vehicle drive, no longer reach the level required for the comfortable heating to cover the entire heat requirement of the passenger compartment. The same applies to installations in motor vehicles with hybrid drive, i.e. in motor vehicles driven by electric motors as well as also combustion engines.

If the total heat requirement of the passenger compartment cannot be covered by means of the heat from the engine coolant circulation, auxiliary heating measures are required, such as electric resistance heaters, known as Positive Temperature Coefficient Thermistors (PTC resistance) or fuel heaters. The same applies to installations in motor vehicles driven purely electromotively or in fuel cell-powered vehicles. A more efficient feasibility for heating the air for the passenger compartment is a heat pump with air as the heat source, in which a refrigerant circulation serves as the only heating means as well as also as an auxiliary heating measure.

An air-conditioning system with downstream electric resistance heating unit, for one, is cost-efficient of production and can be utilized in any motor vehicle, it has, however, a very high requirement of electric energy since the inflowing air for the passenger compartment during its flow across an evaporator of a refrigerant circulation is first cooled and/or dehumidified as well as subsequently heated by means of the electric resistance heating unit which transfers the heat directly to the inflowing air or to a coolant circulation.

While the operation of a conventional air-conditioning system to be run as a heat pump is efficient, it does however require a great deal of installation space, also at positions within the motor vehicle which do not have any installation space provisions for climate control. The increased expenditures, especially in the production and maintenance, as well as the large installation space requirement, are obstructive and inconvenient.

Air-air heat pumps of prior art that are developed for combined chiller mode and heat pump mode, i.e. for heating mode as well as also for reheat mode, absorb heat from the ambient air. Consequently, the ambient air serves as the heat source for the evaporation of the refrigerant. Conventional air-air heat pumps have a heat exchanger for the heat transfer between the refrigerant and the surrounding, a heat exchanger for the heat supply from the air to be conditioned of the passenger compartment to the refrigerant as well as a heat exchanger for the heat transfer from the refrigerant to the air to be conditioned for the passenger compartment. In each case the energy is transferred between the refrigerant and air.

In so-called reheat mode the air to be supplied to the passenger compartment is cooled, in the process dehumidified and subsequently minimally heated again. The required reheat energy in this operating mode is less than the required cooling energy for cooling and dehumidifying the air.

The heat exchanger for the heat transfer between the refrigerant and the ambient air of the air-air heat pump is disposed outside of the housing of the air-conditioning system, specifically outside of the air conditioner, on the front side of the motor vehicle and is, in particular, charged with air by the airstream during travel. The heat exchanger located outside of the housing of the air conditioner is also referred to as ambient heat exchanger.

During operation of the refrigerant circulation in chiller mode the ambient heat exchanger Is run as a condenser/gas cooler for the heat output from the refrigerant to the ambient air and during operation of the refrigerant circulation in heat pump mode, it is run as evaporator for heat absorption by the refrigerant from the ambient air. The ambient heat exchanger is consequently laid out for operation in both functions such that the layout, however, is not optimal for either of the two functions.

When the refrigerant in subcritical operation of the refrigerant circulation, such as for example with the refrigerant R134a or at certain ambient conditions, is liquified with carbon dioxide, the heat exchanger is referred to as condenser. A portion of the heat transfer takes place at constant temperature. During supercritical operation, or at supercritical heat output in the heat exchanger, the temperature of the refrigerant decreases steadily. In this case the heat exchanger is also referred to as gas cooler. Supercritical operations can occur under certain ambient conditions or operating modes of the refrigerant circulation, for example when operating with carbon dioxide as the refrigerant.

DE 10 2012 111 672 A1 discloses a refrigerant circulation of an air conditioner for conditioning the air of a passenger compartment of a motor vehicle. The refrigerant circulation is developed for the combined operation in chiller mode and heat pump mode as well as for reheat mode and comprises a compressor, a heat exchanger for the heat transfer between the refrigerant and the surrounding, a first expansion element as well as a heat exchanger for the heat supply from the air to be conditioned of the passenger compartment to the refrigerant, a heat exchanger for the heat transfer from the refrigerant to the air to be conditioned for the passenger compartment and a second expansion element following thereon in the direction of flow of the refrigerant.

The refrigerant circulation includes a branching system of connection lines which can only be integrated with difficulty into the available installation space. Moreover, the additional valves and the refrigerant store with large-volume layout and disposed at low pressure level require each large installation space. In addition, the valves must posses very high internal impermeability, which also leads to increased system costs.

DE 10 2012 108 891 A1 describes an air-conditioning system for conditioning the air of the passenger compartment, comprising a housing with two flow channels for conducting air as well as a refrigerant circulation with an evaporator and a condenser. The evaporator is here located in the first flow channel and the condenser in the second flow channel. The air-conditioning system is developed for cooling and for heating the passenger compartment as well as for reheat operation. Setting the operating mode is only carried out via the control of the air guide devices such that refrigerant switching valves for switching over between different operating modes can be omitted.

Independently of the particular operating mode, one blower each for the evaporator side and for the condenser side of the air-conditioning system and, thus, two separately operable blowers have to be provided. Herein, for example, during operation in chiller mode, the energy of the airstream during travel on the condenser side cannot be utilized for heat output. The associated blower is always in a state of operation which can lead to vibrations and noise. In addition, installation space provisions at positions are necessary within the motor vehicle that do not have any installation space provisions for air-conditioning.

Figure 1:
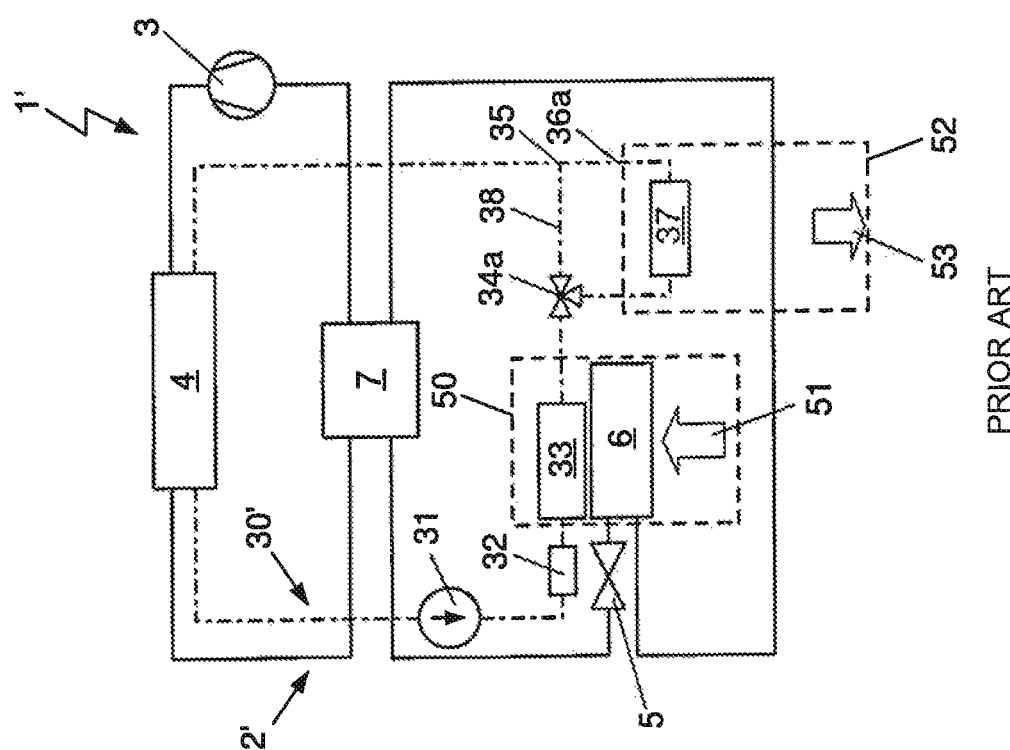

FIG. 1 depicts an air-conditioning system 1' of prior art with a refrigerant circulation 2' and a coolant circulation 30'. The refrigerant circulation 2' comprises in the direction of flow of the refrigerant a compressor 3, a refrigerant-coolant heat exchanger 4 operated as condenser/gas cooler, an expansion element 5 as well as a refrigerant-air heat exchanger 6 operated as evaporator. The compressor 3 suctions the refrigerant out of the evaporator 6. The refrigerant circulation 1' is closed.

The refrigerant circulation 1' can also be developed with an internal heat exchanger 7. By internal heat exchanger 7 is to be understood a heat exchanger internal to the circulation, which serves for the heat transfer between the refrigerant at high pressure and the refrigerant at low pressure. On the one hand, the liquid refrigerant is, for example, cooled down further after the condensation and, on the other hand, the suction gas is superheated before the compressor 3.

In the direction of flow of the coolant, the coolant circulation 30' comprises a conveying device 31, in particular a pump, for circulating the coolant, an auxiliary thermal heat exchanger 32 for heating the coolant, specifically an electric resistance heater (PTC) as well as a thermal heat exchanger 33 as a first coolant-air heat exchanger for heating the inflowing air for the passenger compartment. The thermal heat exchanger 33 is connected with the refrigerant-coolant heat exchanger 4. The coolant circulation 30' is closed. The refrigerant-coolant heat exchanger 4, operated on the refrigerant side as condenser/gas cooler, is consequently coolant cooled. In the connection line realized between the thermal heat exchanger 33 and the refrigerant-coolant heat exchanger 4 are provided, in addition, a three-way valve 34a as a branching site as well as an opening site 35, between which a first flow path 36a with a second coolant-air heat exchanger 37 for transferring heat to air as well as a second flow path 38 as a bypass around the coolant-air heat exchanger 37 are developed. The second coolant-air heat exchanger 37 is disposed within an installation module 52 and is charged with air in the direction of flow 53.

The refrigerant-air heat exchanger 6, operated as evaporator, of the refrigerant circulation 2' and the thermal heat exchanger 33 of the coolant circulation 30' are disposed within an air conditioner 50 as well as in the direction of flow 51 of the inflowing air of the passenger compartment such that they are successively chargeable. The inflowing air, after being cooled and/or dehumidified during its flow across the evaporator 6, can thereby be heated as needed during its flow across the thermal heat exchanger 33.

Heat transferable in the thermal heat exchanger 33 to the inflowing air of the passenger compartment can be composed of energies transferred to the refrigerant in the evaporator 6 and in the compressor 3, which as a sum are transferred in the refrigerant-coolant heat exchanger 4 to the coolant, as well as of the heat transferred in the auxiliary thermal heat exchanger 32 to the coolant, in order to a reach an adequate temperature of the inflowing air.

The air-conditioning system 1' can be operated exclusively at temperatures of the inflowing air flowing against the evaporator 6 at values above 0° C. At values of the temperature of the air below 0° C. the heating capacity is determined, and thus provided inefficiently, by the auxiliary thermal heat exchanger 32, in particular the electric resistance heater.

At temperatures of the air in the range of 0° C. and below the heat transfer area of the evaporator 6 can freeze over. As a consequence of the absorption of heat from the air, the relative air humidity of the cooled air increases. When falling below dew temperature, the water vapor present in the air condenses out and is deposited as water on the heat transfer surface. The water that had condensed out of the air on the heat transfer surface will solidify to ice at surface temperatures in the range of 0° C. and below. The increasing ice layer decreases the heat transfer area at the air side as well as the heat transfer on that side and therewith the heat transfer between air and the refrigerant to be evaporated.

The problem addressed by the invention comprises providing an air-conditioning system for a motor vehicle, which can be operated in chiller mode, in heat pump mode as well as also in reheat mode. The ambient air, depending on operating mode, is intended to serve as a heat source, for example when operating in heat pump mode, as well as also as a heat sink, for example when operating in chiller mode. The heat exchanger for absorbing heat from ambient air is intended to be optimally laid out.

In addition, the air-conditioning system is intended to be efficiently operable, for example entailing minimal freezing risks of the evaporator of the refrigerant circulation for the heat transfer with air, and to be of simple construction. In addition, the refrigerant circulation of the air-conditioning system is to be of simple construction and it is to comprise a minimally necessary number of components to cause only minimal operating costs, production costs and maintenance costs as well as have a minimal installation space requirement.

One problem, in addition, addressed by the invention comprises providing a method for operating the air-conditioning system with which several heat exchangers are operable at different or identical pressure levels.

The problem is resolved by the subject matters or the method with the characteristics of the independent patent claims. Further developments are specified in the dependent patent claims.

The problem is resolved through an air-conditioning system according to the invention for conditioning the air of a passenger compartment in a motor vehicle, in particular for operation in chiller mode, in heat pump mode as well as in reheat mode, with a refrigerant circulation and a coolant circulation. In the direction of flow of the refrigerant the refrigerant circulation comprises a compressor, a refrigerant-coolant heat exchanger, operable as condenser/gas cooler, for the heat transfer between the refrigerant and the coolant of the coolant circulation, a first expansion element as well as a first refrigerant-air heat exchanger for conditioning the inflowing air for the passenger compartment. The coolant circulation is developed with a conveying device for circulating the coolant, a first coolant-air heat exchanger for heating the inflowing air for the passenger compartment, a second coolant-air heat exchanger as well as the refrigerant-coolant heat exchanger.

The chiller mode serves primarily for cooling, the heat pump mode for heating and the reheat mode for post-heating the inflowing air of the passenger compartment to be conditioned. In reheat mode the inflowing air had been cooled and/or dehumidified before reheating.

According to the concept of the invention the refrigerant circulation is developed with a second refrigerant-air heat exchanger exclusively operable as evaporator. Upstream of the second refrigerant-air heat exchanger in the direction of flow of the refrigerant a second expansion element is disposed. The second expansion element as well as the second refrigerant-air heat exchanger together are disposed within a first flow path.

The second coolant-air heat exchanger of the coolant circulation and the second refrigerant-air heat exchanger of the refrigerant circulation are advantageously disposed within an installation module as well as in the of direction of flow of the air in said sequence such that they are successively chargeable.

According to a further development of the invention through the installation module, disposed in particular in a front region of the motor vehicle, can be conducted air conducted out of the passenger compartment or ambient air or air conducted out of the passenger compartment and ambient air.

According to a first alternative implementation of the invention, the first refrigerant-air heat exchanger and the second refrigerant-air heat exchanger are disposed within the refrigerant circulation such that flow can be conducted through them in series.

The refrigerant circulation advantageously comprises a second flow path with a valve. The first flow path with the second expansion element as well as with the second refrigerant-air heat exchanger as well as the second flow path extend each from a branching site to an opening site such that the second flow path is developed as a bypass parallel to the first flow path.

According to a second alternative implementation of the invention, the first refrigerant-air heat exchanger and the second refrigerant-air heat exchanger are disposed within the refrigerant circulation such that flow can be conducted through them in parallel.

A further advantage of the invention resides therein that the first flow path with the second expansion element and the second refrigerant-air heat exchanger extend from a branching site to an opening site. The first expansion element, the first refrigerant-air heat exchanger and a third expansion element are herein developed within a second flow path. The third expansion element is disposed downstream of the refrigerant-air heat exchanger. The second flow path is also developed extending from the branching site to the opening site.

The refrigerant circulation furthermore comprises preferably at least an additional heat exchanger operable as evaporator as well as a fourth expansion element upstream of the heat exchanger, which are developed within a third flow path. The third flow path herein extends from the branching site to the opening site such that the first flow path, the second flow path as well as the third flow path, and therewith the first refrigerant-air exchanger, the second refrigerant-air heat exchanger and the further heat exchanger, operable as evaporator, are each disposed in parallel to one another.

The further heat exchanger, operable as evaporator and disposed within the third flow path, is advantageously developed as a refrigerant-coolant heat exchanger.

According to a further development of the invention, a collector as a refrigerant store is disposed within the refrigerant circulation in the direction of flow of the refrigerant before the compressor.

According to an implementation alternative thereto of the invention, a collector is developed as refrigerant store integrated within the refrigerant-coolant heat exchanger of the refrigerant circulation.

According to a first alternative implementation of the invention, the coolant circulation includes a branching site and an opening site that are developed between a first coolant-air heat exchanger for heating the inflowing air for the passenger compartment and the refrigerant-coolant heat exchanger. Between the branching site and the opening site extend in each case a first flow path with the second coolant-air heat exchanger as well as a second flow path as a bypass around the second coolant-air heat exchanger. The first coolant-air heat exchanger for heating the inflowing air for the passenger compartment and the second coolant-air heat exchanger are thus disposed such that coolant flow can be conducted through them successively in series.

According to a second alternative implementation of the invention the coolant circulation comprises a branching site and an opening site, wherein the branching site is developed between the conveying device and the first coolant-air heat exchanger for heating the inflowing air for the passenger compartment as well as the opening site between the first coolant-air heat exchanger and the refrigerant-coolant heat exchanger. The second coolant-air heat exchanger is developed within a first flow path and the first coolant-air heat exchanger for heating the inflowing air for the passenger compartment is developed within a second flow path. The first flow path and the second flow path each extend from the branching site up to the opening site such that the first coolant-air heat exchanger and the second coolant-air heat exchanger are disposed such that coolant can flow through them in parallel.

The branching site is preferably developed in each case as a three-way valve.

The refrigerant circulation advantageously comprises an internal heat exchanger.

The problem of the invention is also resolved through a method according to the invention for operating an air-conditioning system of a motor vehicle with a refrigerant circulation and a coolant circulation for operation in chiller mode, in heat pump mode and in reheat mode for the inflowing air of the passenger compartment to be conditioned.

According to the concept of the invention, with the second refrigerant-air heat exchanger, exclusively operable as evaporator, of the refrigerant circulation heat is transferred from air to refrigerant. The pressure level of the refrigerant is herein set within the second refrigerant-air heat exchanger such that the pressure level of the refrigerant within the second refrigerant-air heat exchanger corresponds to or is less than the pressure level of the refrigerant within the first refrigerant-air heat exchanger.

According to a further development of the invention, through the first refrigerant-air heat exchanger and the second refrigerant-air heat exchanger of the refrigerant circulation flows refrigerant successively in series or in parallel.

According to a preferred implementation of the invention, through the first coolant-air heat exchanger and the second coolant-air heat exchanger of the coolant circulation coolant is conducted successively in series or parallel to one another.

In a direction of flow of the air the second coolant-air heat exchanger and subsequently the second refrigerant-air heat exchanger are preferably charged with air.

In summary, the air-conditioning system according to the invention has diverse advantages:
  air-conditioning, in particular cooling, dehumidifying and/or heating the inflowing air of the passenger compartment with minimal energy input, also through the utilization of waste heat flows for heating the passenger compartment,
  utilization of a refrigerant-air heat exchanger, specifically for operation as evaporator, for employment during operation in heat pump mode in order to absorb heat from the surrounding especially at low outside temperatures, wherein at higher external temperatures and cooling needs heat is output to the surrounding across a component different from the refrigerant-air heat exchanger, therein minimal refrigerant-side pressure losses and maximal heat uptake from the air as well as minimal icing risk of the heat transfer area,
  increased capability, efficiency and service life, as well as provision of adequate comfort within the passenger compartment with
  constructively simple refrigerant circulation, which is integratable for use into known plans and existing installation spaces of current motor vehicles in circulation and has minimal constructed volume, minimal weight as well as a minimal number of components, thereby
  minimal operating costs as well as minimal production and maintenance costs.

Figure 3:
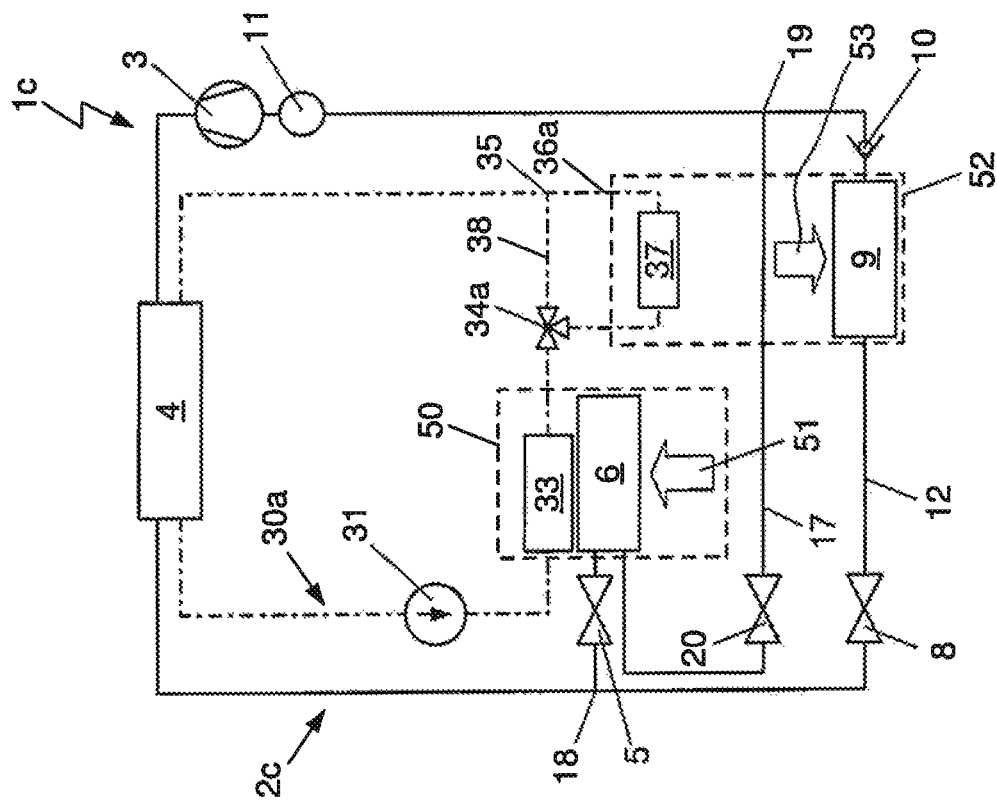
Figure 4:
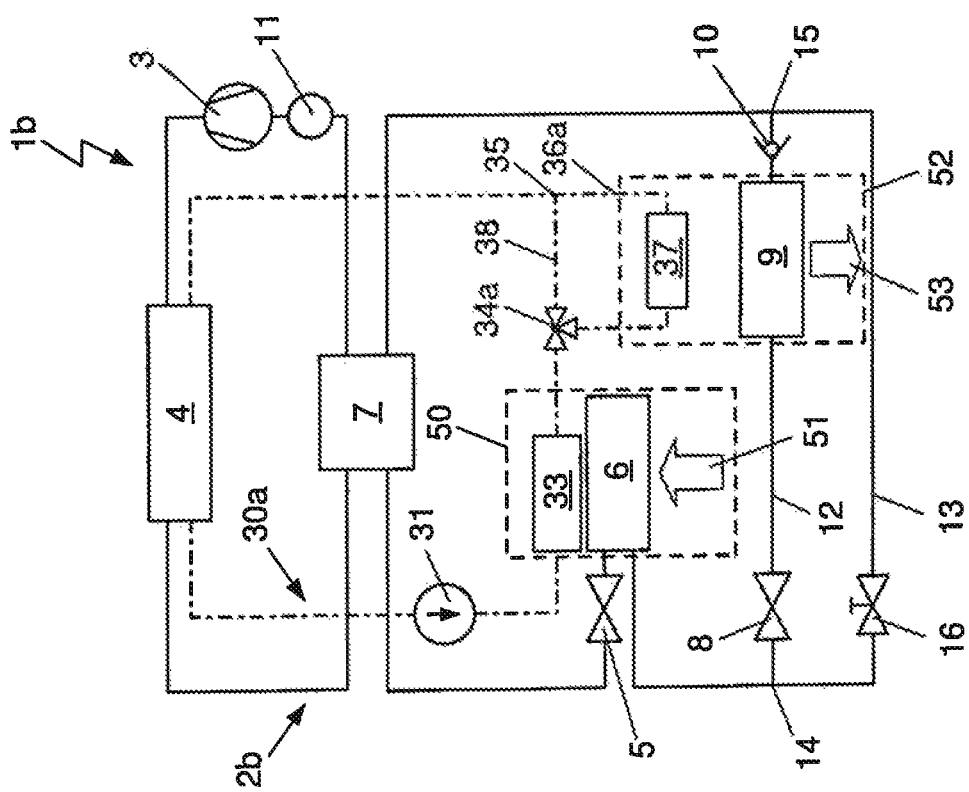
Figure 5:
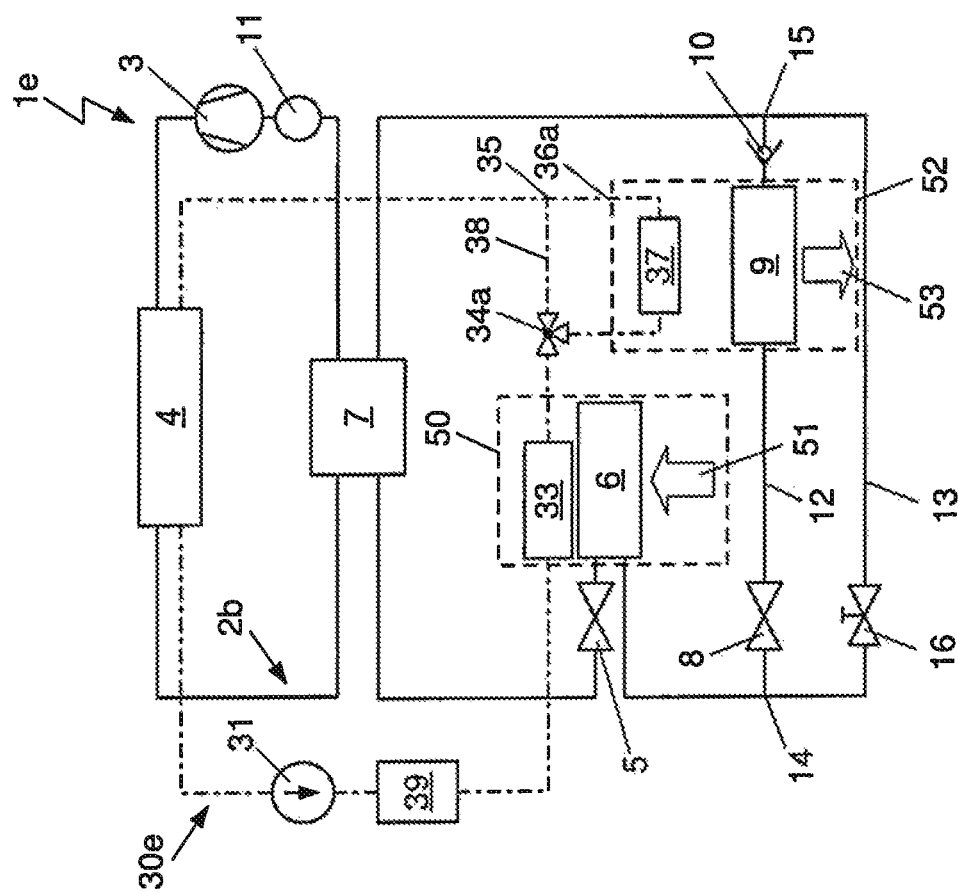
Figure 6:
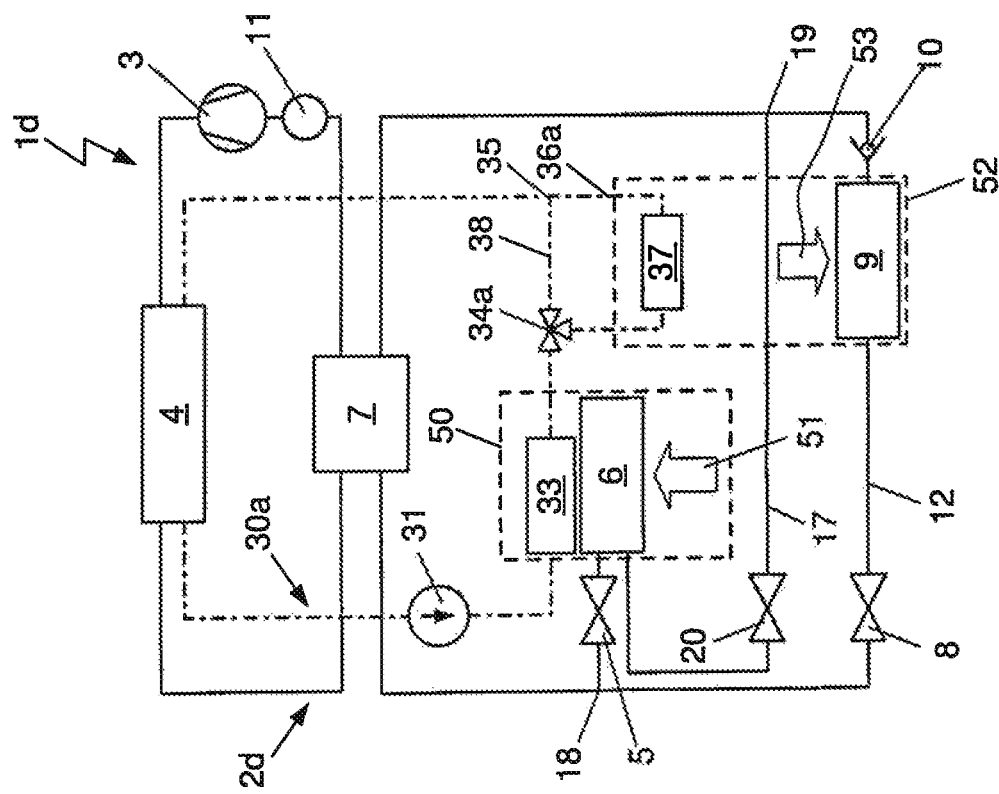
Figure 8:
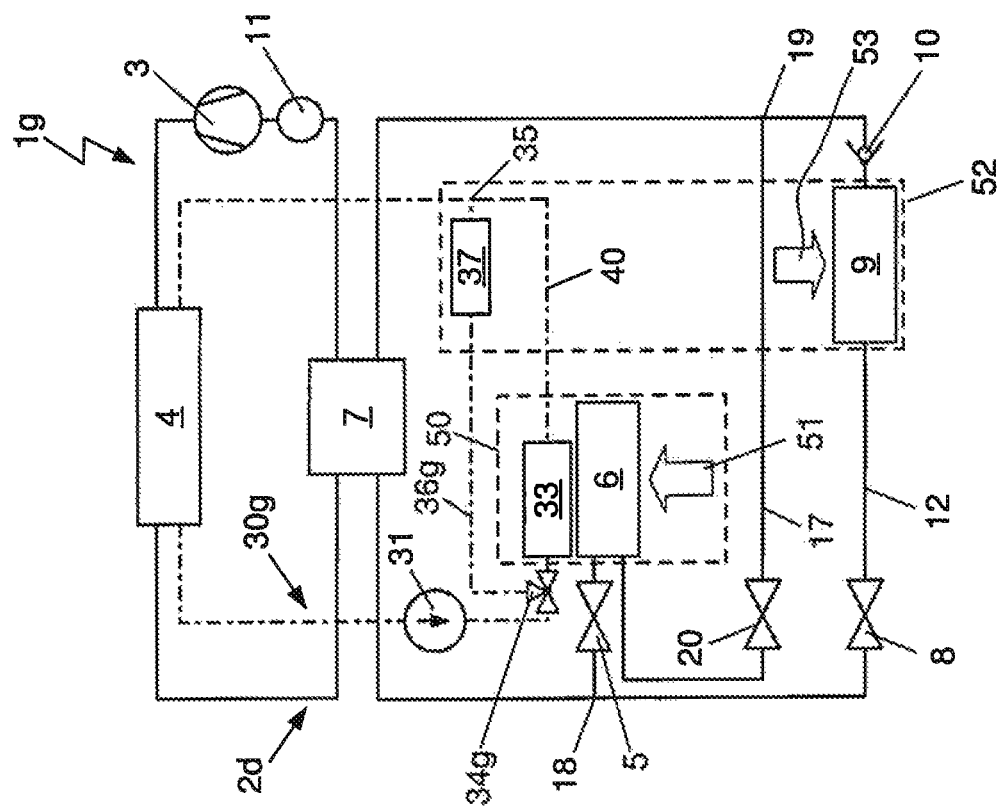
Figure 7:
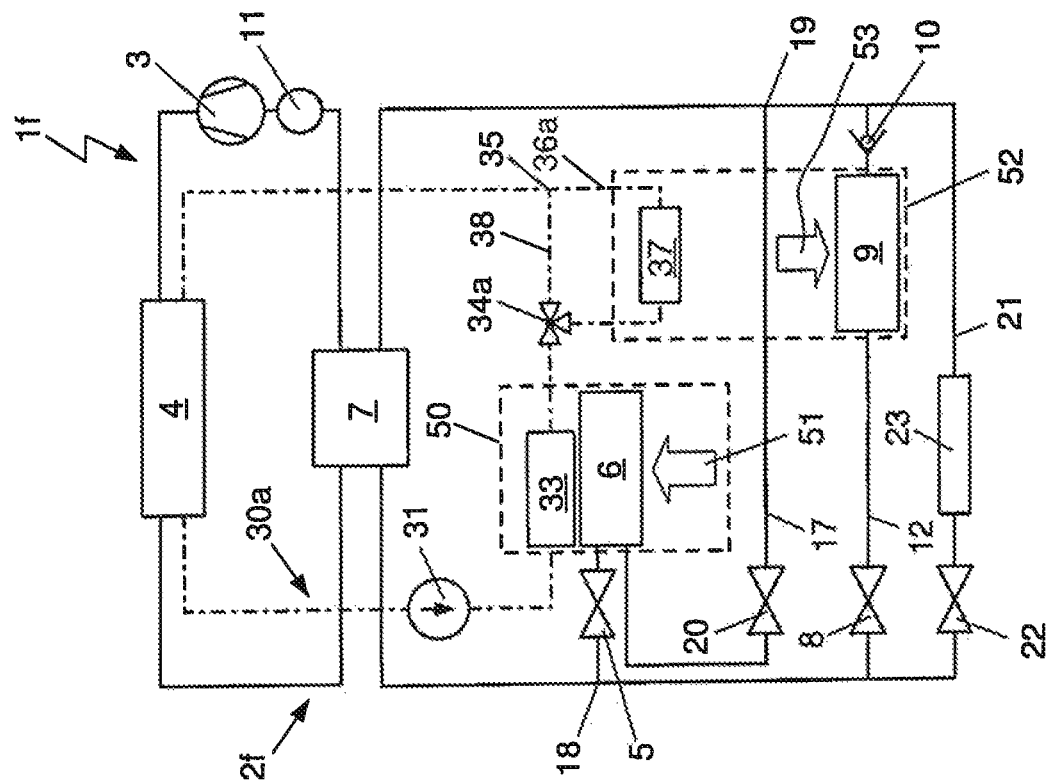

Further details, characteristics and advantages of implementations of the invention are evident based on the following description of embodiment examples with reference to the associated drawing. Each of the Figures shows an air-conditioning system with a refrigerant circulation comprising a first and a second refrigerant-air heat exchanger, with a coolant circulation comprising a first and a second coolant-air heat exchanger, as well as with a refrigerant-coolant heat exchanger thermally connecting refrigerant circulation and coolant circulation, with:

FIG. 2: a refrigerant circulation with refrigerant-air heat exchangers disposed in series, FIG. 3: a refrigerant circulation of FIG. 2 with an internal heat exchanger, FIG. 4 a refrigerant circulation with refrigerant-air heat exchangers disposed in parallel to one another, FIG. 5: a refrigerant circulation of FIG. 4 with an internal heat exchanger, FIG. 6: a refrigerant circulation of FIG. 3 as well as a coolant circulation with an additional heat exchanger for incorporating a further heat source for heat recovery, FIG. 7: a refrigerant circulation of FIG. 5 with an additional heat exchanger, in particular operable as evaporator, for incorporating a further heat source for heat recovery, as well as FIG. 8: a refrigerant circulation of FIG. 5 as well as a coolant circulation with changed disposition of the coolant-air heat exchangers.

In FIG. 2 is shown an air-conditioning system 1a with a refrigerant circulation 2a and a coolant circulation 30a. The refrigerant circulation 2a comprises in the direction of flow of the refrigerant a compressor 3, a refrigerant-coolant heat exchanger 4, operated as condenser/gas cooler, a first expansion element 5 as well as a first refrigerant-air heat exchanger 6 for conditioning the inflowing air for the passenger compartment. The refrigerant circulation 2a, furthermore, is developed with a second refrigerant-air heat exchanger 9, operated as evaporator, for the transfer of heat from air to refrigerant, upstream of which a second expansion element 8 is disposed. The first refrigerant-air heat exchanger 6 and the second refrigerant-air heat exchanger 9 are disposed in a row, or serially, with respect to one another. The second refrigerant-air heat exchanger 9 and the associated second expansion element 8 are developed within a first flow path 12. The second refrigerant-air heat exchanger 9 advantageously has the constructed volume of a conventional air-charged refrigerant-air heat exchanger operated as condenser/gas cooler.

Between the second refrigerant-air heat exchanger 9 and the compressor 3 is disposed a collector 11. The collector 11, disposed in the direction of flow of the refrigerant before the compressor 3 and thus located at the low pressure side, also referred to accumulator, serves for the separation and the collection of refrigerant fluid. The compressor 3 suctions gaseous refrigerant from the collector 11. The refrigerant circulation 1a is closed. According to an alternative embodiment not shown, the collector is integrated as a refrigerant store within the refrigerant-coolant heat exchanger 4 and thus is disposed at the high pressure level of the refrigerant. Therewith the collector 11 disposed at the low pressure level can be omitted. The refrigerant-coolant heat exchanger 4 can moreover be developed with a means for drying the refrigerant.

Apart from the first flow path 12, the refrigerant circulation 2a comprises a second flow path 13 which extends from a branching site 14 to an opening site 15. The second flow path 13, developed parallel to the first flow path 12, specifically parallel to the second refrigerant-air heat exchanger 9, comprises a valve 16, in particular a shut-off valve 16, and serves as a bypass to conduct a refrigerant mass flow around the second refrigerant-air heat exchanger 9.

Within the first flow path 12 between the refrigerant-air heat exchanger 9 and the opening site 15 a check element 10, in particular a check valve, is disposed. The check element 10 prevents the return flow of the refrigerant mass flow, conducted along the second flow path 13, and therewith around the refrigerant-air heat exchanger 9, back into the refrigerant-air heat exchanger 9.

In the direction of flow of the coolant, the coolant circulation 30a comprises a conveying device 31, in particular a pump, for circulation the coolant as well as a thermal heat exchanger 33 as a first coolant-air heat exchanger for heating the inflowing air for the passenger compartment. The thermal heat exchanger 33 is moreover connected with the refrigerant-coolant heat exchanger 4. The coolant circulation 30a is closed.

The refrigerant-coolant heat exchanger 4, operated at the refrigerant side as condenser/gas cooler, is consequently coolant cooled.

In the connection line, developed between the thermal heat exchanger 33 and the refrigerant-coolant heat exchanger 4, a three-way valve 34a as a branching site as well as an opening site 35 are additionally provided, between which a first flow path 36*a* with a second coolant-air heat exchanger 37 for transferring heat to air as well as a second flow path 38 as a bypass around the coolant-air heat exchanger 37 are developed.

The thermal heat exchanger as a first coolant-air heat exchanger 33 and the second coolant-air heat exchanger 37 are therewith disposed such that coolant can flow through them successively in series.

The second coolant-air heat exchanger 37 of the coolant circulation 30*a* and the second refrigerant-air heat exchanger 9, operated as evaporator, of the refrigerant circulation 2*a* are disposed within an installation module 52 as well as in the existing installation space of the motor vehicle as well as in the direction of flow 53 of the air such that they can be charged successively. Through the installation module 52 disposed in the front region of the motor vehicle air, conducted out of the passenger compartment and ambient air or a mixture of air conducted out of the passenger compartment and ambient air, can flow. The air-conditioning system 1*a* can consequently utilize as a heat source the latent heat of the air conducted out of the passenger compartment and also heat from the surrounding.

The air is herein initially conducted across the coolant-air heat exchanger 37 and subsequently across the refrigerant-air heat exchanger 9, such that the disposition of the heat exchangers 9, 37 differs from a conventionally known disposition, which further reduces the risk of the heat transfer area of the refrigerant-air heat exchanger 9 icing over.

Furthermore, a ventilator for blowing against the coolant-air heat exchanger 37 can also be utilized for blowing against the refrigerant-air heat exchanger 9. The refrigerant-air heat exchanger 6 of the refrigerant circulation 2*a* and the thermal heat exchanger 33 of the coolant circulation 30*a* are disposed within an air conditioner 50 as well as in the direction of flow 51 of the inflowing air of the passenger compartment such that they can be charged successively one after the other. The inflowing air for the passenger compartment, cooled and/or dehumidified during its flow across the evaporator 6, can be heated as needed when flowing across the thermal heat exchanger 33. The air, conditioned previously during its flow across the refrigerant-air heat exchanger 6, can be regulated by, not shown, temperature louvers during its flow toward the thermal heat exchanger 33.

The refrigerant-coolant heat exchanger 4 serves for the thermal connection of the refrigerant circulation 2*a* with the coolant circulation 30*a*. The heat from the refrigerant is hereby transferred to the coolant.

In particular when operated with ambient air, i.e. with air as the heat source that had been conducted out of the passenger compartment, the air-conditioning system 1*a* can be operated even at temperatures of the outside air at values below 0° C. without the risk of the heat transfer area of the refrigerant-air heat exchanger 9, operated as evaporator, icing over.

To ensure this operation, the refrigerant-air heat exchanger 6 disposed in the air conditioner 50 is charged with refrigerant at an intermediate pressure level and operated as evaporator. The latent heat to be discharged from the air during the dehumidification of the air entering the evaporator, is herein utilized, together with the energy supplied to the refrigerant during the compression in compressor 3, in order to heat the inflowing air for the passenger compartment to the desired output temperature. The heat absorbed by the refrigerant is herein transferred in the coolant-cooled refrigerant-coolant heat exchanger 4 to the coolant, which emits the absorbed heat to the inflowing air during the flow through the thermal heat exchanger 33.

When operated in chiller mode or in reheat mode for dehumidifying the inflowing air, the excess heat, absorbed by the refrigerant and transferred to the coolant, is conducted through the first flow path 36*a* of the coolant circulation 30*a* and output to air in the second coolant-air heat exchanger 37, also referred to as low temperature cooler, in the front region of the motor vehicle. Independently of the operating mode, the coolant is circulated and is heated during its flow through the refrigerant-coolant heat exchanger 4.

When operating the air-conditioning system 1*a* in heat pump mode, or in reheat mode, the heat, transferable in the thermal heat exchanger 33 to the inflowing air of the passenger compartment, can be composed of the energies from the first refrigerant-air heat exchanger 6, operated as evaporator, and from the second refrigerant-air heat exchanger 9, operated as evaporator, and transferred in the compressor 3 to the refrigerant, which energies are transferred in total in the refrigerant-coolant heat exchanger 4 to the coolant in order to attain an adequate temperature of the inflowing air for the passenger compartment.

The refrigerant-air heat exchanger 9 configured exclusively to absorb heat and therewith for operation as evaporator, is herein charged with refrigerant at a low pressure level.

Depending on the requirement, i.e. if the heat provided in the refrigerant circulation 2*a* for heating the inflowing air of the passenger compartment during operation in reheat mode is sufficient and in the second refrigerant-air heat exchanger 9 no additional heat absorption is necessary, the second refrigerant-air heat exchanger 9 can be blocked off from the refrigerant circulation 2*a* and be circumvented in the bypass through the second flow path 13. The valve 16 is opened while the expansion element 8, formed as expansion valve, is closed.

During operation of the air-conditioning system 1*a* in heat pump mode the expansion element 8, upstream of the second refrigerant-air heat exchanger 9, can be regulated so as to relieve the pressure of the refrigerant to a low pressure level at which the input temperature of the refrigerant is only minimally below the temperature of the air, in particular of the ambient air. At the temperature associated with the low pressure level the refrigerant is evaporated.

The first refrigerant-air heat exchanger 6, operated as condenser/gas cooler, is herein charged with refrigerant at an intermediate pressure level and can, if required, preheat the inflowing air for the passenger compartment flowing into the air conditioner 50. During its flow across the coolant-charged thermal heat exchanger 33 the inflowing air is further heated.

The two-stage heating of the inflowing air increases the efficiency of the operation of the air-conditioning system 1*a* by increasing the possible enthalpy difference of the refrigerant before the pressure relieve and therewith the evaporation in the second refrigerant-air heat exchanger 9.

FIG. 3 shows an air-conditioning system 1*b* with a refrigerant circulation 2*b* and a coolant circulation 30*a*. In contrast to the refrigerant circulation 2*a* of the air-conditioning system 1*a* from FIG. 2, the refrigerant circulation 2*b* is developed with an internal heat exchanger 7.

The internal heat exchanger 7 is developed at the high pressure side between the refrigerant-coolant heat exchanger 4 and the first expansion element 5 of the first refrigerant-air heat exchanger 6 as well as at the low pressure side between the opening site 15 and the collector 11 or the compressor 3.

The internal heat exchanger 7 serves herein for the heat transfer between the refrigerant at high pressure and the refrigerant at low pressure, wherein, on the one hand the liquid refrigerant flowing out of the heat exchanger 4, operated as condenser/gas cooler, is further cooled and, on the other hand, the refrigerant leaving the heat exchanger 6, 9, operated as evaporator, as the suction gas is superheated before the compressor 3.

Apart from the protection of the compressor 3 against water hammer, with the operation of the refrigerant circulation 2b with internal heat exchanger 7, the specific compressor capacity can be reduced as well as simultaneously the specific cooling capacity, and therewith the efficiency of the operation of the air-conditioning system 1b, can be increased.

In FIG. 4 is evident an air-conditioning system 1c with a refrigerant circulation 2c and a coolant circulation 30a. The coolant circulation 30a is developed corresponding to the coolant circulation 30a of the air-conditioning system 1a, 1b according to FIGS. 2 and 3. The air-conditioning system 1c differs from the air-conditioning systems 1a, 1b only in the development of the refrigerant circulations 2a, 2b.

In the direction of flow of the refrigerant, the refrigerant circulation 2b comprises the compressor 3, the refrigerant-coolant heat exchanger 4, operated as condenser/gas cooler, the first expansion element 5 as well as the first refrigerant-air heat exchanger 6 for conditioning the inflowing air for the passenger compartment. Downstream of the refrigerant-air heat exchanger 6 is disposed a third expansion element 20, in particular an expansion valve. The combination of first expansion element 5, first refrigerant-air heat exchanger 6 and third expansion element 20 is disposed within a second flow path 17 which extends from a branching site 18 to an opening site 19.

The refrigerant circulation 2c is furthermore developed with the second refrigerant-air heat exchanger 9, operated as evaporator, for the transfer of heat from air to the refrigerant, upstream of which is located the second expansion element 8. The first refrigerant-air heat exchanger 6 and the second refrigerant-air heat exchanger 9 are disposed parallel to one another. The second refrigerant-air heat exchanger 9 and the associated second expansion element 8 are developed within the first flow path 12, which, like the second flow path 17, extends from the branching site 18 to the opening site 19. The first flow path 12, which comprises between the refrigerant-air heat exchanger 9 and the opening site 19 a check element 10, in particular a check valve, and the second flow path 19 consequently run parallel. The second refrigerant-air heat exchanger 9 advantageously has the constructed volume of a conventional, air-charged refrigerant-air heat exchanger operated as condenser/gas cooler.

Between the opening site 19 and the compressor 3, again, a collector 11 is disposed. According to an alternative, not shown, embodiment, the collector is integrated within the refrigerant-coolant heat exchanger 4 as a refrigerant store and therewith disposed at the high pressure level of the refrigerant, wherein the collector 11 located at the low pressure level can be omitted. The refrigerant-coolant heat exchanger 4 can, moreover, be developed with a device for drying the refrigerant.

When operating the air-conditioning system 1c in reheat mode, the second refrigerant-air heat exchanger 9 can be blocked off from the refrigerant circulation 2c depending on the requirement, i.e. if the heat provided in the refrigerant circulation 2c is sufficient for heating the inflowing air of the passenger compartment and in the second refrigerant-air heat exchanger 9 no additional heat absorption is necessary.

The second expansion element 8, developed as an expansion valve, is closed as is the case during operation of the air-conditioning system 1c in chiller mode.

During operation of the air-conditioning system 1c in heat pump mode, the first expansion element 5, which is a valve, can be closed while the second expansion element 8 is open. The first refrigerant-air heat exchanger 6 is herein not charged with refrigerant. The entire refrigerant mass flow is conducted through the second refrigerant-air heat exchanger 9 for the absorption of heat.

In FIG. 5 is shown an air-conditioning system 1d with a refrigerant circulation 2d and a coolant circulation 30a. In contrast to the refrigerant circulation 2c of the air-conditioning system 1c of FIG. 4, the refrigerant circulation 2d is developed with an internal heat exchanger 7.

The internal heat exchanger 7 is developed at the high pressure side between the refrigerant-coolant heat exchanger 4 and the branching site 18 as well as at the low pressure side between the opening site 19 and the collector 11 or the compressor 3.

With respect to the development and operating mode of the refrigerant circulation 2d with internal heat exchanger 7, reference is made to the explanations regarding the refrigerant circulation 2b of FIG. 3.

FIG. 6 shows an air-conditioning system 1e with a refrigerant circulation 2b of the air-conditioning system 1b of FIG. 3 as well as with a coolant circulation 30e. The coolant circulation 30e comprises an additional heat exchanger 39 to incorporate an additional heat source for heat recover by coolant. The air-conditioning system can herein also comprise a refrigerant circulation 2a according to FIG. 2, a refrigerant circulation 2c according to FIG. 4 or a refrigerant circulation 2d according to FIG. 5.

The heat exchanger 39 is herein disposed between the conveying device 31 and the thermal heat exchanger 33, such that the heat transferred in heat exchanger 39 to the coolant, for example for the heat transfer to the inflowing air to the passenger compartment, is available.

The air-conditioning system 1e can advantageously be utilized in systems for motor vehicles with hybrid drive, in particular in motor vehicles with a battery that can be charged across a combustion engine as well as from the electricity network, so-called plug-in hybrid vehicles, or for motor vehicles with classic combustion engines. The heat transfer 39 can herein serve for cooling the combustion engine or the battery or electric components.

In FIG. 7 an air-conditioning system 1f is shown with a refrigerant circulation 2f and a coolant circulation 30a. The refrigerant circulation 2f, in contrast to refrigerant circulation 2d of the air-conditioning system 1d of FIG. 5, is developed with an additional heat exchanger 23, in particular operated as evaporator, to incorporate a further heat source for heat recover by the refrigerant. The air-conditioning system can herein also be developed with a refrigerant circulation 2c according to FIG. 4.

The refrigerant circulation 2f thus comprises in the direction of flow of the refrigerant the compressor 3, the refrigerant-coolant heat exchanger 4 operated as condenser/gas cooler, the first expansion element 5 as well as the first refrigerant-air heat exchanger 6 for conditioning the inflowing air for the passenger compartment. The third expansion element 20 is disposed downstream of the refrigerant-air heat exchanger 6. The combination of first expansion element 5, first refrigerant-air heat exchanger 6 and third expansion element 20 is disposed within the second flow path 17, which extends from the branching site 18 to the opening site 19.

The refrigerant circulation 2f is, moreover, developed with the second refrigerant-air heat exchanger 9 operated as evaporator, for the transfer of heat from air to refrigerant, upstream of which is disposed the second expansion element 8. The second refrigerant-air heat exchanger 9 and the associated second expansion element 8 as well as the check element 10 are developed within the first flow path 12 which, like the second flow path 17, extends from the branching site 18 to the opening site 19.

The refrigerant circulation 2f, in contrast to the refrigerant circulation 2d of the air-conditioning system 1d of FIG. 5, comprises in addition a further heat exchanger 23 operated as evaporator, for the transfer of heat, in particular of a coolant, to the refrigerant. The heat exchanger 23, preferably developed as refrigerant-coolant heat exchanger, is preceded by a fourth expansion element 22, in particular an expansion valve. The additional heat exchanger 23, which is utilized as a so-called chiller for battery cooling, and the associated fourth expansion element 22 are developed within a third flow path 21, which substantially also extends from the branching site 18 to the opening site 19.

The first flow path 12, the second flow path 17 and the third flow path 21, and thus the first refrigerant-air heat exchanger 6, the second refrigerant-air heat exchanger 9 and the additional heat exchanger 23 are each disposed parallel to one another.

FIG. 8 depicts an air-conditioning system 1g with a refrigerant circulation 2d of the air-conditioning system 1d of FIG. 5 and a coolant circulation 30g. The coolant circulation 30g and the coolant circulation 30a of the air-conditioning systems 1a, 1b, 1c, 1d, 1f of FIG. 2 to 5 and 7, differ in the disposition of the coolant-air heat exchangers 33, 37 or the disposition of the branching site 34g developed as three-way valve. The air-conditioning system can herein also comprise a coolant circulation 30e of the air-conditioning system 1e according to FIG. 6.

The three-way valve 34g is herein provided in the connection line developed between the conveying device 31 and the thermal heat exchanger 33, while the opening site 35 is developed between the thermal heat exchanger 33 and the refrigerant-coolant heat exchanger 4. The second coolant-air heat exchanger 37 is developed within the first flow path 36g and the thermal heat exchanger 33 is developed within a second flow path 40, each of which extends from the branching site 34g to the opening site 35.

The thermal heat exchanger 33 as the first coolant-air heat exchanger 33 and the second coolant-air heat exchanger 37 are thereby disposed such that the coolant can flow through them in parallel.

Of advantage is that the components of the refrigerant heat exchangers 2a, 2b, 2c, 2d, 2f and the coolant circulations 30a, 30e, 30g are available, wherein the second refrigerant-air heat exchanger 9 disposed within the installation module 52, is developed as a heat exchanger operated exclusively as evaporator.

Since, additionally, only the refrigerant-air heat exchanger 9 and in particular valves are to be disposed within the designed space, the air-conditioning system 1a, 1b, 1c, 1d, 1e, 1f, 1g can be installed into existing architectures without significant expenditures.

Since with the first refrigerant-air heat exchanger 6, also referred to as interior space evaporator, heat can always be transferred to the refrigerant, efficiency advantages compared to conventional air-condition systems, can be demonstrated. By utilizing the use of the coolant-cooled heat exchanger 4, the coolant is heated in every case of operation. In particular when operated in heat pump mode or in reheat mode, additional heat can be provided via the heat exchanger 23 for cooling a battery, the heat exchanger 39 for cooling a combustion engine or via an electric resistance heater. The electric resistance heater can herein be laid out markedly smaller than is known in prior art, it consumes less energy and thus is more advantageous of production and operation.

The operation of the air-conditioning system 1a, 1b, 1c, 1d, 1e, 1f, 1g under mild climatic conditions such as occur in Europe at an 80% frequency, is markedly more efficient than using classic air-conditioning systems.

The refrigerant circulation and the operating modes are applicable for each refrigerant that experiences a phase transition from liquid to gaseous at the low pressure side. At the high pressure side the medium, by undergoing gas cooling/condensation and supercooling, releases the absorbed heat to a heat sink. As refrigerant natural substances such as R744, R717 and similar, combustible substances such as R290, R600, R600a and the like, chemical substances such as R134a, R152a, HFO-1234yf, as well as diverse refrigerant mixtures can be utilized.

The second refrigerant-air heat exchanger 9, operated in particular as evaporator, is preferably developed with a, not shown, integrated device for separating gaseous refrigerant from liquid refrigerant as well as with an evaporation range for liquid refrigerant and an overflow region for gaseous refrigerant. The device, also referred to as separator or phase separator and developed integrated within the refrigerant-air heat exchanger 9, for separating the gaseous refrigerant from the liquid refrigerant, separates the liquid phase from the gaseous phase of the refrigerant before the refrigerant flows through a heat-transferring section of the refrigerant-air heat exchanger 9. The heat-transferring section of the refrigerant-air heat exchanger 9 is herein subdivided into two regions: an active region, also denoted as evaporation region, and an inactive region, also denoted as overflow region.

The active region is chargeable with air, wherein heat from the air can be transferred to the refrigerant. The inactive region is preferably not charged with air such that no heat is transferred within the inactive region.

On the refrigerant side the liquid refrigerant, separated in the device for the separation of the gaseous refrigerant from the liquid refrigerant, flows through the active region of the refrigerant-air heat exchanger 9 and is evaporated with the absorption of heat. The separated gaseous refrigerant is conducted through the inactive region of the refrigerant-air heat exchanger 9 and thus flows, without taking up heat, through the refrigerant-air heat exchanger 9.

The refrigerant-air heat exchanger 9 comprises a first and a second collector pipe that are connected with one another across pipe elements disposed in parallel. The device for the separation of the gaseous refrigerant from the liquid refrigerant is herein disposed, for example either within a collector pipe or between the collector pipes connecting the collector pipes with one another. The two phases of the refrigerant are thereby mechanically separated from one another, wherein the mechanical separation rests on the force of inertia as the driving force which necessitates a sufficiently large density difference between the phases of the refrigerant.

LIST OF REFERENCE NUMBERS 1a-1g, 1' Air-conditioning system
2a-2d, 2f, 2' Refrigerant circulation
3 Compressor
4 Heat exchanger, refrigerant-coolant heat exchanger 5 First expansion element
6 Heat exchanger, first refrigerant-air heat exchanger
7 Internal heat exchanger
8 Second expansion element
9 Heat exchanger, second refrigerant-air heat exchanger
10 Check element
11 Collector
12 First flow path
13 Second flow path
14 Branching site
15 Opening site
16 Valve, shut-off valve
17 Second flow path
18 Branching site
19 Opening site
20 Third expansion element
21 Third flow path
22 Fourth expansion element
23 Heat exchanger
30a, 30e,
   30g, 30' Coolant circulation
31 Conveying device
32 Auxiliary heat exchanger
33 First coolant-air heat exchanger,
   thermal heat exchanger
34a, 34g Branching site, three-way valve
35 Opening site
36a, 36g First flow path
37 Second coolant-air heat exchanger
38 Second flow path
39 Heat exchanger
40 Second flow path
50 Air conditioner
51 Direction of flow of inflowing air to passenger compartment
52 Installation module
53 Direction of flow of air

The invention claimed is:

1. An air-conditioning system of a motor vehicle comprising a coolant circuit, the coolant circuit comprising:
a conveying device,
a first coolant-air heat exchanger for heating the inflowing air for a passenger compartment of the motor vehicle,
a second coolant-air heat exchanger, and
a refrigerant-coolant heat exchanger; and
a refrigerant circuit, the refrigerant circuit comprising:
a compressor,
a refrigerant-coolant heat exchanger operable as a condenser/gas cooler to transfer heat between the refrigerant and coolant of the coolant circuit, and
a second refrigerant-air heat exchanger operable exclusively as an evaporator;
a first expansion valve and a first refrigerant-air heat exchanger for conditioning the inflowing air for the passenger compartment, a second expansion valve disposed upstream of the second refrigerant-air heat exchanger in a direction of flow of the refrigerant, wherein the second expansion valve and the second refrigerant-air heat exchanger are disposed within a first flow path, wherein the first expansion valve is disposed upstream of the first refrigerant-air heat exchanger, wherein the second expansion valve is disposed downstream of the first refrigerant-air heat exchanger,
wherein the refrigerant circuit comprises a second flow path having a valve, wherein the first flow path and the second flow path extend from a branching site to an opening site and the second flow path is developed as a bypass parallel to the first flow path,
wherein, when heat provided in the refrigerant circuit for heating the inflowing air of the passenger compartment is greater than or equal to a predetermined value, the valve is opened while the second expansion valve is closed, so that heat absorption in the second refrigerant-air heat exchanger does not occur, and
wherein the coolant circuit comprises a branching site and an opening site, wherein a first flow path extending between the branching site and the opening site and having the second coolant-air heat exchanger is provided and wherein a second flow path as a bypass around the second coolant-air heat exchanger is provided.

2. The air-conditioning system as in claim 1, wherein the second coolant-air heat exchanger of the coolant circuit and the second refrigerant-air heat exchanger of the refrigerant circuit are disposed within an installation module.

3. The air-conditioning system as in claim 2, wherein the installation module wherein air conducted out of the passenger compartment, ambient air, or a mixture thereof flows therethrough.

4. The air-conditioning system as in claim 1, wherein the first refrigerant-air heat exchanger and the second refrigerant-air heat exchanger are disposed in series.

5. The air-conditioning system as in claim 1, wherein the first refrigerant-air heat exchanger and the second refrigerant-air heat exchanger are disposed within the refrigerant circuit such that a flow can be conducted through them in parallel.

6. The air-conditioning system as in claim 5, wherein the first flow path with the second expansion valve and the second refrigerant-air heat exchanger is positioned such that it extends from a branching site to an opening site, and wherein the first expansion valve, the first refrigerant-air heat exchanger and a third expansion valve are positioned within a second flow path, wherein the third expansion valve is disposed downstream of the refrigerant-air heat exchanger and the second flow path extends from the branching site to the opening site.

7. The air-conditioning system as in claim 6, wherein the refrigerant circuit comprises a heat exchanger operable as an evaporator, and a fourth expansion valve, wherein the fourth expansion valve is disposed upstream of the heat exchanger, which are positioned within a third flow path, and wherein the third flow path extends from the branching site to the opening site.

8. The air-conditioning system as in claim 7, wherein the heat exchanger is a refrigerant-coolant heat exchanger.

9. The air-conditioning system as in claim 1, wherein a collector is disposed within the refrigerant circuit.

10. The air-conditioning system as in claim 1, wherein a collector is integrated within the refrigerant-coolant heat exchanger.

11. The air-conditioning system as in claim 10, wherein the branching site is a three-way valve.

12. The air-conditioning system as in claim 1, wherein the coolant circulation comprises a branching site and an opening site, wherein the branching site is disposed between the conveying device and the first coolant-air heat exchanger, and wherein the opening site is disposed between the first coolant-air heat exchanger and the refrigerant-coolant heat exchanger, wherein the second coolant-air heat exchanger is disposed within a first flow path and the first coolant-air heat exchanger within a second flow path, and wherein the first flow path and the second flow path extend from the branching site to the opening site.

13. The air-conditioning system as in claim 1, wherein the refrigerant circuit comprises an internal heat exchanger.

14. A method for operating an air-conditioning system of a motor vehicle, the system having a refrigerant circuit and a coolant circuit for operation in chiller mode, in heat pump mode and in reheat mode for the inflowing air to be conditioned of the passenger compartment according to claim 1, wherein heat is transferred from air to refrigerant in the second refrigerant-air heat exchanger, wherein the pressure level of the refrigerant within the second refrigerant-air heat exchanger is set such that the pressure level of the refrigerant within the second refrigerant-air heat exchanger corresponds to the pressure level of the refrigerant within the first refrigerant-air heat exchanger or is less than the pressure level of the refrigerant within the first refrigerant-air heat exchanger; wherein the second refrigerant-air heat exchanger is an evaporator.

15. The method for operating an air-conditioning system as in claim 14, wherein refrigerant is conducted in series or in parallel through the first refrigerant-air heat exchanger and the second refrigerant-air heat exchanger.

16. The method for operating an air-conditioning system as in claim 14, wherein coolant is conducted in series or parallel through the first coolant-air heat exchanger and the second coolant-air heat exchanger.

\* \* \* \* \*